(12) United States Patent
Fujisaki et al.

(10) Patent No.: US 9,122,135 B2
(45) Date of Patent: Sep. 1, 2015

(54) LENS SHIFT MECHANISM AND PROJECTION IMAGE DISPLAY DEVICE

(75) Inventors: Takeshi Fujisaki, Hyogo (JP); Taichi Yoshimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 375 days.

(21) Appl. No.: 13/878,518

(22) PCT Filed: Sep. 22, 2011

(86) PCT No.: PCT/JP2011/071547
§ 371 (c)(1),
(2), (4) Date: Apr. 9, 2013

(87) PCT Pub. No.: WO2012/053309
PCT Pub. Date: Apr. 26, 2012

(65) Prior Publication Data
US 2013/0208250 A1 Aug. 15, 2013

(30) Foreign Application Priority Data

Oct. 22, 2010 (JP) ................................. 2010-237806

(51) Int. Cl.
*G03B 21/14* (2006.01)
*G03B 5/06* (2006.01)
*G02B 7/02* (2006.01)

(52) U.S. Cl.
CPC .............. *G03B 21/142* (2013.01); *G02B 7/023* (2013.01); *G03B 5/06* (2013.01); *G03B 21/147* (2013.01)

(58) Field of Classification Search
CPC .............................. H04N 5/225; G02B 3/0037
USPC .......... 353/100, 101; 359/649, 694, 822, 823; 348/360
See application file for complete search history.

(56) References Cited

U.S. PATENT DOCUMENTS

2011/0090471 A1 4/2011 Fujisaki et al.

FOREIGN PATENT DOCUMENTS

| JP | 3-159377 | 7/1991 |
| JP | 8-186752 | 7/1996 |
| JP | 3050563 B2 | 6/2000 |
| JP | 2004-062000 | 2/2004 |
| JP | 2004-317988 | 11/2004 |
| JP | 2009-282075 | 12/2009 |
| JP | 2011-085798 | 4/2011 |

*Primary Examiner* — William C Dowling
*Assistant Examiner* — Jerry Brooks
(74) *Attorney, Agent, or Firm* — Hamre, Schumann, Mueller & Larson, P.C.

(57) ABSTRACT

A central position detection section has a detection width in which the central position has a median value along one axial direction. When the direction from a position, which is located at the time at which returning is started toward the central position is defined as a go direction, the control section commands that a drive mechanism should sequentially perform following operations: a first operation of driving a projection lens assembly in the go direction; a second operation of allowing the projection lens assembly to travel in a return direction at least by the detection width; and a third operation of allowing the projection lens assembly to travel in the detection width in the go direction by ½ of the detection width traveled in the go direction.

8 Claims, 9 Drawing Sheets

| It is determined to be upper side from central position in up-and-down direction |
| :---: |
| 1 |
| 0 |
| 2 |
| It is determined to be down side from central position in up-and-down direction |

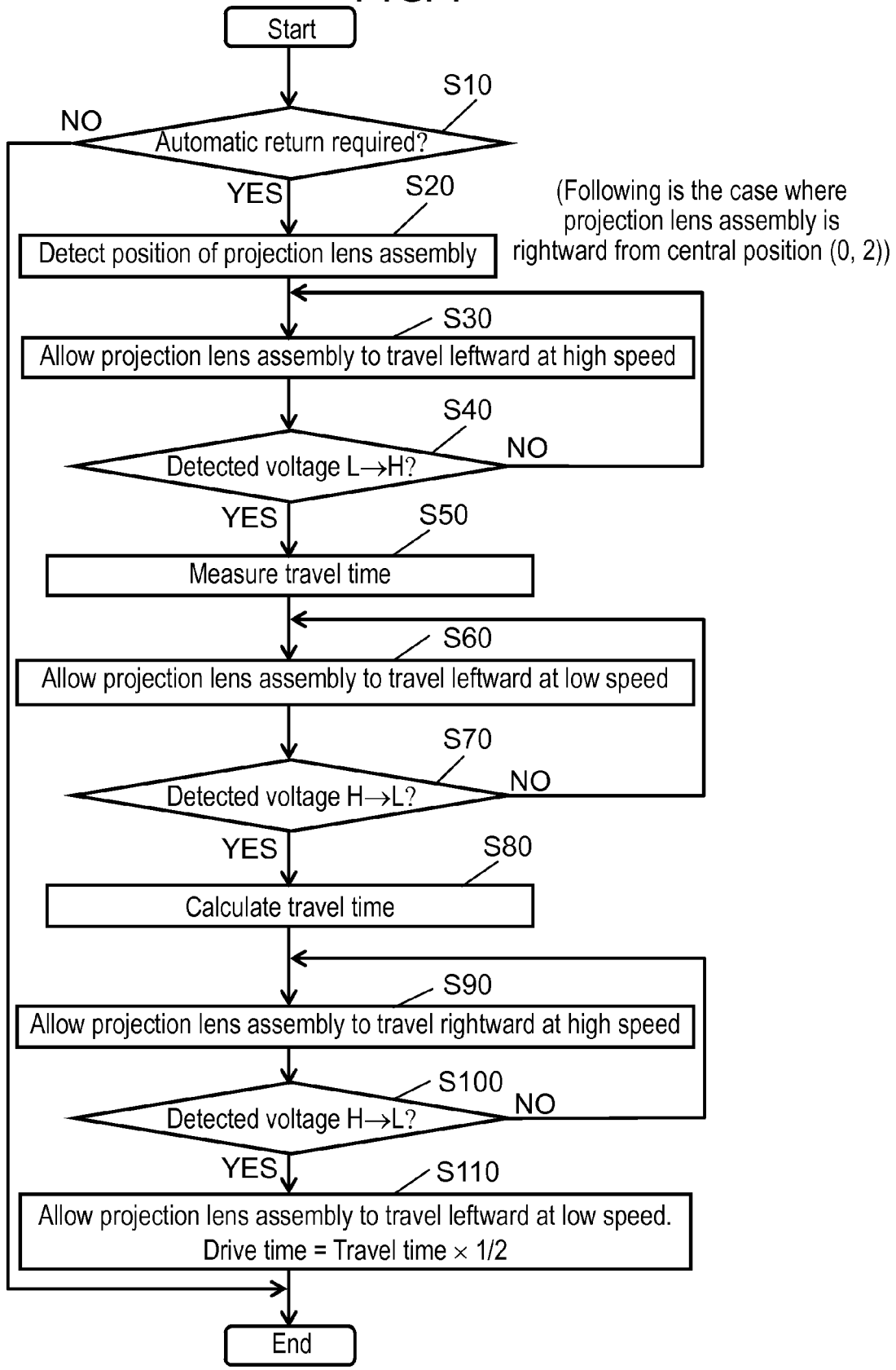

LENS SHIFT MECHANISM AND PROJECTION IMAGE DISPLAY DEVICE

This application is a U.S. National Phase Application of PCT International Application PCT/JP2011/071547.

TECHNICAL FIELD

The present invention relates to a lens shift mechanism and a projection image display device, and more particularly relates to a lens shift mechanism having a function of automatically returning a projection lens assembly and a projection image display device.

BACKGROUND ART

A projector as a projection image display device includes a device configured to shift a position of a projection lens in a predetermined range by the use of, for example, a motor so as to adjust a position of a projection screen. For example, Japanese Patent Unexamined Publication No. 2004-62000 (Patent Literature 1) discloses a configuration as a shift control method of a projection lens in which the projection lens or a movable member integrated with the projection lens is provided, a sensor that senses arrival of the projection lens or the movable member is disposed in the vicinity of an end portion of the shift range, and when the sensor senses the arrival of the projection lens or the movable member during shifting of the projection lens, a speed switching unit decreases driving force of the motor to a predetermined value. In Patent Literature 1, such a configuration prevents the projection lens or the movable member from strongly colliding with the other fixing member to be locked to the end portion in the shift range during a shift operation of the projection lens.

CITATION LISTS

Patent Literature

Patent Literature 1: Japanese Patent Unexamined Publication No. 2004-62000

SUMMARY OF THE INVENTION

A lens shift mechanism is for allowing a projection lens assembly to travel in a go and return direction in a certain range in at least one axial direction among axes perpendicular to an optical axis of the projection lens assembly. The lens shift mechanism includes a drive mechanism for driving the projection lens assembly in at least the one axial direction; a control section for controlling the drive mechanism such that the projection lens assembly is returned to a central position in the certain range; and a central position detection section for detecting that the projection lens assembly reaches the central position. The central position detection section has a detection width in which the central position has a median value along the one axial direction. When a direction from a position, which is located at a time point at which returning is started, toward the central position, is defined as a go direction, the control section commands that the driving mechanism should perform following operations: a first operation of allowing the projection lens assembly to travel in the go direction and to pass one end of the detection width through at least the detection width; after the first operation, a second operation of allowing the projection lens assembly to travel in a return direction by at least the detection width; and after the projection lens assembly travels in at least the detection width by the second operation, a third operation of allowing the projection lens assembly to travel in the go direction from one end of the detection width by ½ of the detection width which has been traveled in the go direction.

Another lens shift mechanism is a projection lens assembly to travel in a go and return direction in a certain range in at least one axial direction among axes perpendicular to an optical axis of the projection lens assembly. The lens shift mechanism includes a drive mechanism for driving the projection lens assembly in at least the one axial direction; a control section for controlling the drive mechanism such that the projection lens assembly is returned to a central position in the predetermined range; and a central position detection section for detecting that the projection lens assembly reaches the central position. The central position detection section has a detection width in which the central position has a median value along the one axial direction. When a direction from a position, which is located at a time point at which returning is started, toward the central position, is defined as a go direction, the control section commands that the driving mechanism should perform following operations: a first operation of allowing the projection lens assembly to travel in the go direction to one end of the detection width, and a second operation of allowing the projection lens assembly to travel in the go direction from the one end of the detection width by ½ of the detection width based on information of the detection width, the information is supplied by a storage section which has previously stored the information in travelling in the go direction.

A projection image display device includes a lens shift mechanism according to any of the above; an optical modulation section for image-modulating light from a light source based on an image input signal; and a projection section which is supported by the lens shift mechanism, and which enlarge-projects light from the optical modulation section onto a projection surface.

BRIEF DESCRIPTION OF THE DRAWINGS

FIG. 7 is a flowchart for illustrating automatic return processing of a projection lens assembly in accordance with this exemplary embodiment.

DESCRIPTION OF EMBODIMENTS

Figure 1:
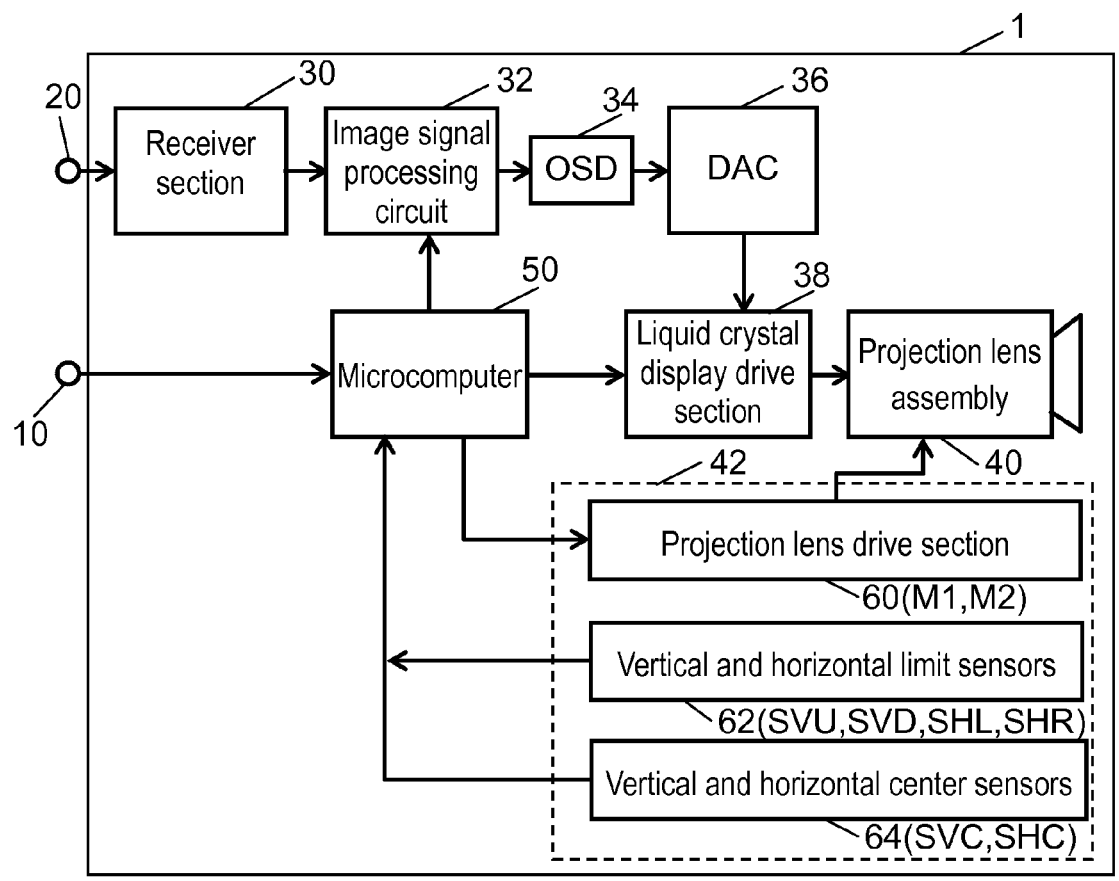
FIG. 1 is a diagram for illustrating a projection image display device in accordance with this exemplary embodiment.

A projector on which a lens shift mechanism is installed includes one having a function of automatically returning a projection lens to the central position in a shift range after a shift operation.

In order to achieve such an automatically returning function, for example, a sensor for sensing arrival of the projection lens to the central position is disposed in the central position in the shift range of the projection lens, and when the sensor senses the arrival of the projection lens during shifting of the projection lens, the projection lens can be returned to the central position by stopping driving of the motor.

However, as the sensor for sensing the arrival of the projection lens, in general, since an optical sensor and the like using passing/blocking of light is used, the sensor has a specific detection width determined by an optical structure. Accordingly, depending upon the size of the detection width of the sensor, a stopping position of the projection lens based on detection results of the sensor may be displaced from the central position in the shift range. Furthermore, there may be a problem that the stopping position of the projection lens varies depending upon the direction in which the projection lens is allowed to travel. As a result, it becomes difficult to accurately return the projection lens to the central position.

In order to solve such problems, it is thought that a sensor provided in the central position is configured as a hardware configuration capable of strictly detecting the central position. However, such a configuration requires formation of further precise components, thus increasing a manufacturing cost. Furthermore, there is limitation in narrowing the detection width of the sensor, the accuracy in automatic returning is limited by the accuracy of the hardware configuration.

Hereinafter, an exemplary embodiment of the present invention is described in detail with reference to drawings. Note here that the same reference numerals are given to the same or corresponding components in the drawings, and the description thereof is not repeated.

FIG. 1 is a diagram for illustrating a projection image display device in accordance with this exemplary embodiment.

With reference to FIG. 1, projection image display device (hereinafter, referred to as "projector") 1 in accordance with this exemplary embodiment is described. Projector 1 is a liquid crystal projector for projecting an image by using a liquid crystal device, which projects (displays) an image by projecting light of the image displayed by the liquid crystal device onto a screen. A projection surface is not limited to a screen but it may be a wall surface.

Projector 1 includes remote control receiving section 10 for receiving an infrared-ray modulated remote control signal sent from a remote controller operated by a user, and input section 20. The remote control signal includes a command signal for remote-controlling projector 1. Input section 20 includes an input port for receiving an image signal supplied from an outside signal supply device (not shown). The signal supply device includes digital signal supply devices such as a DVD (Digital Versatile Disc) reproducing device and a Blu-Ray disc reproducing device for outputting a digital signal, and analog signal supply devices such as computer for outputting an analog signal.

Projector 1 further includes receiver section 30, image signal processing circuit 32, OSD (On Screen Display) circuit 34, DAC (Digital Analog Converter) 36, microcomputer 50, liquid crystal display drive section 38, projection lens assembly 40, and lens shift mechanism 42.

Microcomputer 50 generates a control command based on a command signal input from the remote controller (not shown) via remote control receiving section 10 and outputs the generated control command to each section of projector 1. The control command is executed by arithmetic processing from program or data stored in a nonvolatile memory (not shown) disposed inside microcomputer 50.

Receiver section 30 receives an image signal given from input section 20 and outputs the signal. Receiver section 30 has an ADC (Analog Digital Converter) function of converting the received analog image signal into a digital signal, a certification function following an HDCP (High-Bandwidth Digital Content Protection System), and a function of decoding a code. The HDCP is used for achieving coding of data transmitted according to HDMI (High Definition Multimedia Interface). This can prevent contents such as an image signal transmitted on a transmission line from being illegally copied. Herein, the transmission line herein denotes a line for transmitting data and signals according to the HDMI, but it may be a transmission line according to DVI (Digital Visual Interface).

Image signal processing circuit 32 processes an image signal output from receiver section 30 into a signal to be displayed, and outputs the processed signal. Specifically, image signal processing circuit 32 writes the image signal from receiver section 30 into a memory (not shown) frame by frame (screen by screen), and reads out the image stored in the frame memory. Then, by carrying out various image processing in the processing of writing and reading out, the input image signal is converted so as to generate image data as an image signal for a projection image.

OSD circuit 34 superimposes a signal of image data based on information given from microcomputer 50 onto the image signal output from image signal processing circuit 32, and outputs the image signal after superimposition.

DAC 36 receives an input of the image signal output from OSD circuit 34, converts the signal into an analog signal, and outputs the converted signal to liquid crystal display drive section 38.

Liquid crystal display drive section 38, projection lens assembly 40 and a lamp (not shown) correspond to a "display section" for displaying an image onto a screen according to the image signal output from DAC 36 under control of microcomputer 50.

An operation of the display section is described. Examples of the lamp (not shown) as an illumination device include an extra-high pressure mercury lamp, a metal halide lamp, and a xenon lamp. The lamp is detachably attached to projector 1 via a connector. Light as substantially parallel rays of light is allowed to outgo from the lamp to liquid crystal display drive section 38.

Liquid crystal display drive section 38 includes an optical system (not shown) including a lens and a prism, and each liquid crystal panel of R, G, and B. In liquid crystal display drive section 38, light from the lamp, which has passed through the lens system (not shown) disposed inside, enters each liquid crystal panel of R, G, and B such that light amount distribution becomes uniform. Among light entering via the lens system, light in the blue wavelength range (hereinafter, referred to as "B light"), light in the red wavelength range (hereinafter, referred to as "R light"), and light in the green wavelength range (hereinafter, referred to as "G light") as substantially parallel light enter each of the liquid crystal panels of R, G, and B. Each liquid crystal panel is driven according to an image signal corresponding to R, G and B given by DAC 36, and modulates the light according to the drive state. The R light, G light, and B light modulated by the liquid crystal panel are color-synthesized by a dichroic prism, and then enlarge-projected onto a screen by projection lens assembly 40.

Projection lens assembly 40 includes a lens group for image-forming the projected light on the screen, and an actuator for adjusting a zoom state and a focus state of a projection image by changing a part of the lens group in an optical axis direction.

Projection lens assembly 40 is configured in such a manner that it can shift (travel) in a predetermined range in a plane perpendicular to optical axes of the liquid crystal panel and the dichroic prism, so that a projection screen position with respect to the screen can be adjusted in the up-and-down direction and in the left-and-right direction. Note here that it is possible to allow lens shift mechanism 42 to carry out a shift operation of projection lens assembly 40.

Lens shift mechanism 42 shifts a position of projection lens assembly 40 within a predetermined range so as to adjust the projection screen position thereof. Lens shift mechanism 42 includes projection lens drive section 60, vertical and horizontal limit sensors 62, and vertical and horizontal center sensors 64.

Projection lens drive section 60 is configured by combining a power driving source such as a motor and a power conveying mechanism such as a gear mechanism. Rotation force of the motor is converted into linear travelling force in the up-and-down direction or the left-and-right direction by the power conveying mechanism, thereby enabling projection lens assembly 40 to be shifted in the up-and-down direction or the left-and-right direction. The number of rotations of the motor is controlled by microcomputer 50.

Vertical and horizontal limit sensors 62 and vertical and horizontal center sensors 64 are disposed in predetermined positions in the shift range of projection lens assembly 40, and detect a position state of projection lens assembly 40.

Specifically, vertical and horizontal limit sensors 62 include a vertical limit sensor for detecting that projection lens assembly 40 reaches the upper limit or the down limit in the shift range in the up-and-down direction, and a horizontal limit sensor for detecting that projection lens assembly 40 reaches the left limit or the right limit in the shift range in the left-and-right direction.

Furthermore, vertical and horizontal center sensors 64 include a vertical center sensor for detecting that projection lens assembly 40 reaches the central position in the shift range in the up-and-down direction, and a horizontal center sensor for detecting that projection lens assembly 40 reaches the central position in the shift range in the left-and-right direction.

Various sensors can be used for vertical and horizontal limit sensors 62 and vertical and horizontal center sensors 64. For example, an optical sensor such as a PI (photo interrupter) sensor using passing/blocking of light can be used. Detected signals from vertical and horizontal limit sensors 62 and vertical and horizontal center sensors 64 are output into microcomputer 50.

The shift operation of projection lens assembly 40 can be carried out by using a switch provided on projector 1 main body or a remote control. For example, by turning ON the switch provided on the remote control, the motor is driven and projection lens assembly 40 travels in the shift range. By turning OFF the switch, the motor is stopped and traveling of projection lens assembly 40 is stopped.

Microcomputer 50 drives to control the motor such that projection lens assembly 40 is allowed to travel in go and return directions in the up-and-down direction or the left-and-right direction in the shift range based on a detection signal of vertical and horizontal limit sensors 62 and vertical and horizontal center sensors 64.

Furthermore, microcomputer 50 monitors a position state of projection lens assembly 40 in the above-mentioned shift operation of projection lens assembly 40. After the shift operation, when a reset switch provided on projector 1 main body or the remote control is turned ON, projection lens assembly 40 is automatically returned to the central position in the shift range by the below-mentioned method.

Figure 2:
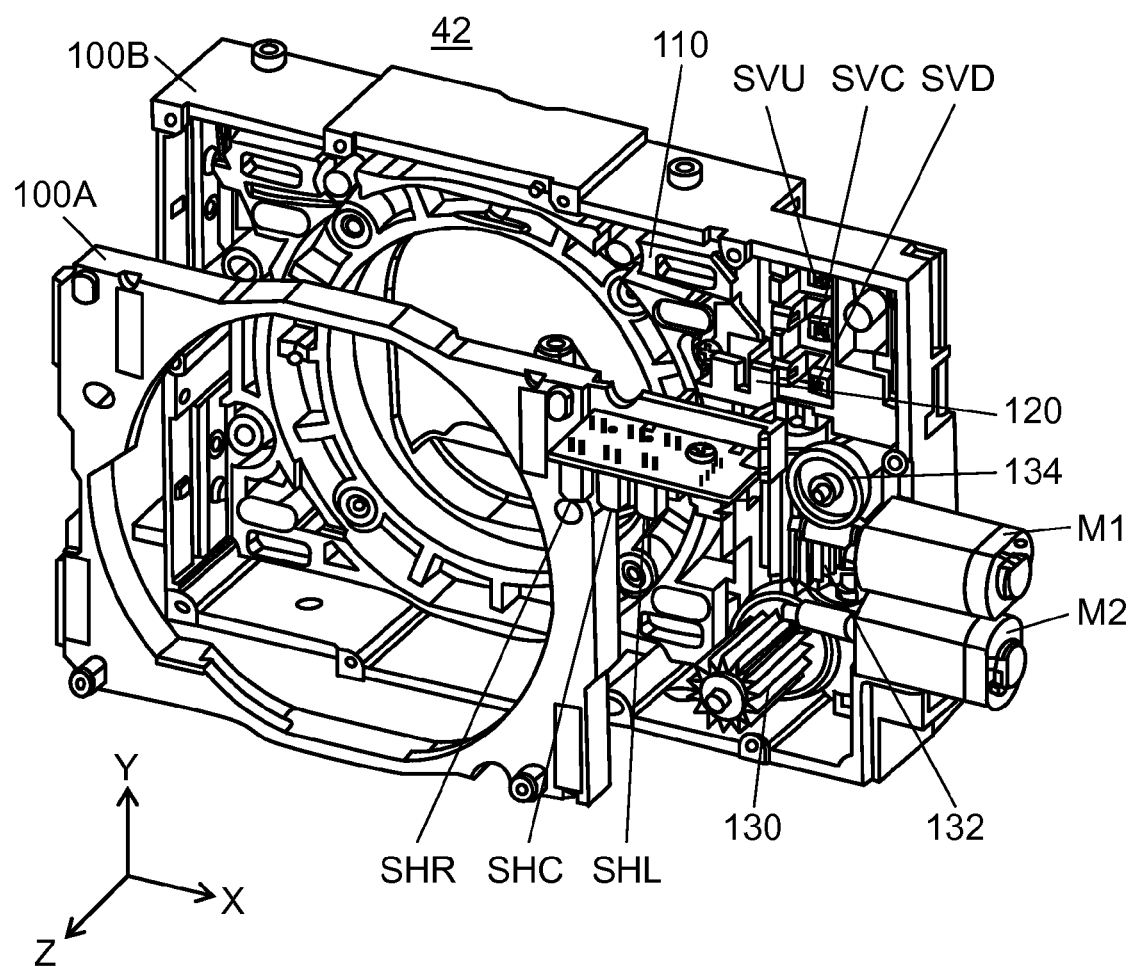
FIG. 2 is an exploded perspective view showing a lens shift mechanism in accordance with this exemplary embodiment.

FIG. 2 is an exploded perspective view showing the lens shift mechanism in accordance with this exemplary embodiment. In the following description, a forward direction of the paper (z-direction) of FIG. 2 is defined as an image projecting direction of projector 1, and left and right are defined with respect to the image projection direction.

With reference to FIG. 2, projection lens assembly 40 (not shown) is attached to a projection lens attachment plate (not shown), which is provided in liquid crystal drive section 38, via fixing members 100A and 100B. That is to say, fixing members 100A and 100B constituting lens shift mechanism 42 are attached to the projection lens attachment plate on liquid crystal drive section 38, and movable member 110 capable of being shifted in the left-and-right direction is attached to fixing members 100A and 100B. Then, projection lens assembly 40 (not shown) is attached to movable member 110, and movable member 110 and projection lens assembly 40 are integrated with each other. In this exemplary embodiment, although not shown for convenience of description, a movable member that is different from movable member 110 (hereinafter, which is referred to as "other movable member") is attached such that it can be shifted in the up-and-down direction with respect to fixing members 100A and 100B. That is to say, in the shift of projection lens assembly 40, movable member 110 and the other movable members are driven independently. The drive in the left-and-right direction is operated by movable member 110, and the drive in the up-and-down direction is operated by the other movable member.

Motor M1 as a driving source for shifting movable member 110 including projection lens assembly 40 is attached to fixing member 100B. The rotation of motor M1 is conveyed to a rotation axis (not shown) via gear 132. The rotation of the rotation axis is conveyed to a sliding member (not shown) that slides in the left-and-right direction. Movable member 110 is connected and fixed to a part of the sliding member, and is shifted along sliding of the sliding member in the left-and-right direction (x-direction). Furthermore, the rotation of motor M2 is conveyed to the rotation axis (not shown) via gear 130. The rotation of the rotation axis is conveyed to a sliding member (not shown) that slides in the up-and-down direction. The other movable member is connected and fixed to a part of the sliding member, and is shifted along sliding of the sliding member in the up-and-down direction (y-direction).

The power conveying mechanism including gears 130 and 132 shown in FIG. 2, the rotation axes, and the sliding members is one example, and other various power conveying mechanisms can be used.

Furthermore, sensors SHL, SHC, and SHR for detecting a position state of projection lens assembly 40 in the left-and-right direction are disposed on fixing member 100A. Furthermore, sensors SVU, SVC, and SVD for detecting a position state of projection lens assembly 40 in the up-and-down direction are disposed on fixing member 100B.

Figure 3:
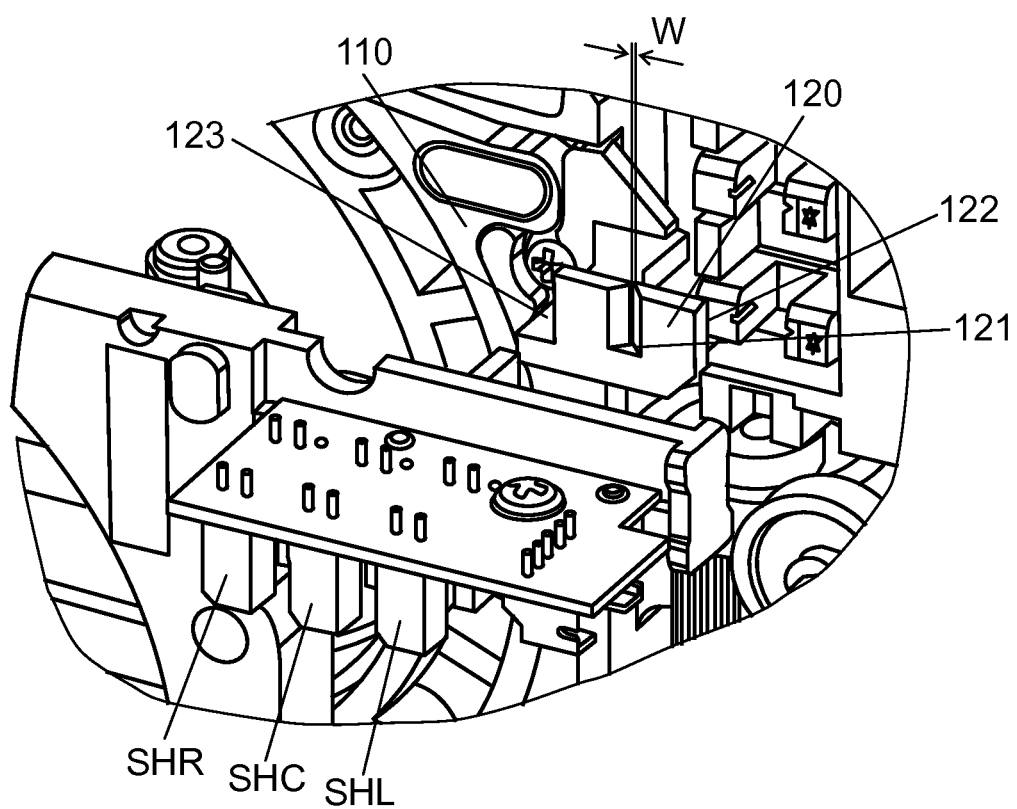
FIG. 3 is an enlarged view showing a part of the lens shift mechanism in accordance with this exemplary embodiment.

FIG. 3 is an enlarged view showing a part of the lens shift mechanism (the sensors SHL, SHC and SHR, and light-shielding plate 120) in accordance with this exemplary embodiment.

Figure 4:
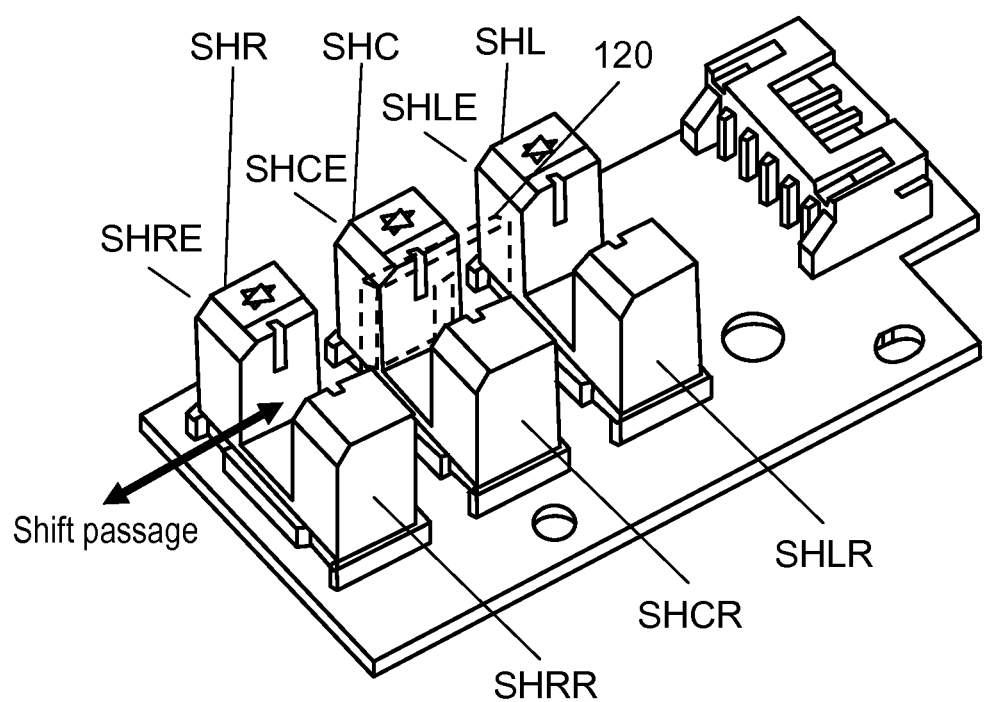
FIG. 4 is a perspective view of sensors SHL, SHC, and SHR of the lens shift mechanism in accordance with this exemplary embodiment.

With reference to FIG. 3, the three sensors SHL, SHC, and SHR are aligned with a predetermined interval in the left-and-right direction. FIG. 4 is a perspective view of the sensors SHL, SHC and SHR of the lens shift mechanism in accordance with this exemplary embodiment.

With reference to FIGS. 3 and 4, each of the sensors SHL, SHC, and SHR is an optical sensor (for example, a PI sensor), and includes light-emitting sections SHLE, SHCE, and SHRE as well as light-receiving sections SHLR, SHCR, and SHRR. The light-emitting sections SHLE, SHCE, and SHRE include light-emitting elements such as a light emitting diode (LED), a light emitting FET, and an EL element. Furthermore, the light-receiving sections SHLR, SHCR, and SHRR include a light-receiving element for receiving light from the light-emitting sections SHLE, SHCE, and SHRE. For the light-receiving element, various light-receiving elements such as a photodiode, a phototransistor, an avalanche photodiode, and a pyroelectric infrared element can be used.

As shown in FIG. 3, light-shielding plate 120 extending in the left-and-right direction is disposed on movable member 110. That is to say, light-shielding plate 120 is shifted in the left-and-right direction with respect to fixing members 100A and 100B in a state in which it is integrated with movable member 110. Light-shielding plate 120 is provided with gap portion 121 having a predetermined width W in the center in the left-and-right direction.

Furthermore, light-shielding plate 120 is disposed such that a space between the light-emitting sections SHLE, SHCE, and SHRE and the light-receiving sections SHLR, SHCR, and SHRR of the sensors SHL, SHC, and SHR is provided as a shift passage in a state in which fixing member 100A and fixing member 100B are assembled with each other. Thus, in each of the sensors SHL, SHC, and SHR, light irradiated from the light-emitting sections SHLE, SHCE, and SHRE to the light-receiving sections SHLR, SHCR, and SHRR is allowed to pass or is blocked according to the shift operation of light-shielding plate 120. The sensors SHL, SHC, and SHR detect a position state of projection lens assembly 40 based on the passing/blocking of light by light-shielding plate 120.

Specifically, when movable member 110 including projection lens assembly 40 is shifted to the right direction, right end portion 122 of light-shielding plate 120 shields sensor SHL. Thereby, based on the detection results, it can be known that projection lens assembly 40 reaches the right limit in the shift range. Furthermore, when movable member 110 is shifted to the left direction, left end portion 123 of light-shielding plate 120 shields the sensor SHR. Thereby, based on the detection results, it can be known that projection lens assembly 40 reaches the left limit in the shift range. That is to say, the sensors SHR and SHL constitute "horizontal limit sensors" in vertical and horizontal limit sensors 62 (FIG. 1).

On the contrary, when movable member 110 is shifted to the right or left direction, light from the light-emitting section SHCE passes through gap portion 121 in light-shielding plate 120 and the light-receiving section SHCR receives the light. Thereby, based on the detection results, it can be known that projection lens assembly 40 reaches the central position in the shift range. That is to say, the sensor SHC constitutes "horizontal center sensor" in the vertical and horizontal center sensors 64 (FIG. 1).

In FIG. 2, the three sensors SVU, SVC, and SVD are aligned with a predetermined interval in the up-and-down direction. Each of the sensors SVU, SVC, and SVD includes the same optical sensor (for example, a PI sensor) as in the sensors SHL, SHC, and SHR, and includes a light-emitting section and a light-receiving section. Furthermore, although not shown, a light-shielding plate extending in the up-and-down direction is disposed to the other movable member. The light-shielding plate is shifted in the up-and-down direction with respect to fixing members 100A and 100B in a state in which it is integrated with the other movable member. The light-shielding plate is provided with a gap portion having a predetermined width W in the center in the up-and-down direction.

Then, the light-shielding plate is disposed such that a space between the light-emitting sections and the light-receiving sections of the sensors SVU, SVC, and SVD is provided as a shift passage in a state in which fixing member 100A and fixing member 100B are assembled with each other. Thus, in each of the sensors SVU, SVC, and SVD, light irradiated from the light-emitting section to the light-receiving section is blocked temporarily according to the shift operation of the light-shielding plate. The sensors SVU, SVC, and SVD detect a position state of projection lens assembly 40 based on the passing/blocking of light by the light-shielding plate.

Specifically, when the other movable member including projection lens assembly 40 is shifted in the upward direction, an upper end portion of the light-shielding plate shields the sensor SVU. Thereby, based on the detection results, it can be known that projection lens assembly 40 reaches the upper limit in the shift range. Furthermore, when the other movable member is shifted in the downward direction, a lower end portion of the light-shielding plate shields the sensor SVD. Thereby, based on the detection results, it can be known that projection lens assembly 40 reaches the lower limit in the shift range. That is to say, the sensors SVU and SVD constitute "vertical limit sensors" in vertical and horizontal limit sensors 62 (FIG. 1).

On the contrary, when the movable member is shifted in the upward direction or the downward direction, light from the light-emitting section of the sensor SVC passes through the gap portion in the light-shielding plate and the light-receiving section of the SVC sensor receives the light. Thereby, based on the detection results, it can be known that projection lens assembly 40 reaches the central position in the shift range. That is to say, the sensor SVC constitutes "vertical center sensor" in the vertical and horizontal center sensors 64 (FIG. 1).

Figure 5:
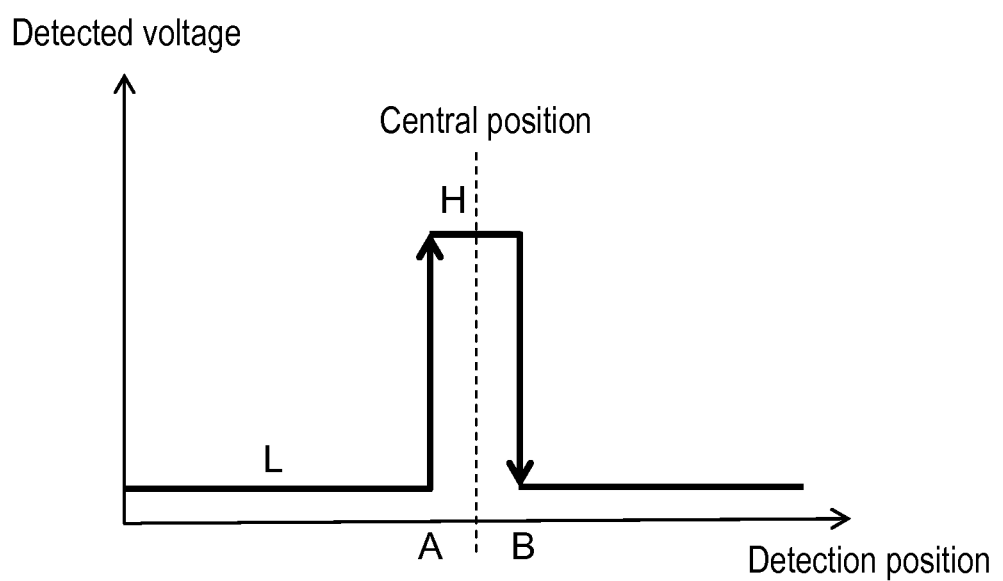
FIG. 5 is a graph showing an example of a detected voltage of the sensor SHC (horizontal center sensor) in accordance with this exemplary embodiment.

FIG. 5 is a graph showing an example of a detected voltage of the sensor SHC (horizontal center sensor) in accordance with this exemplary embodiment.

With reference to FIG. 5, the sensor SHC that is the horizontal center sensor outputs a detected voltage of L (logic low) level during a period of time in which light from the light-emitting section to the light-receiving section is blocked and is not received, and outputs a detected voltage of H (logic high) level during a period of time in which the light from the light-emitting section to the light-receiving section is received.

In this exemplary embodiment, when movable member 110 is shifted in the right or left direction, the gap portion of light-shielding plate 120 passes between the light-emitting section SHCE and the light-receiving section SHCR of the sensor SHC, and thereby light from the light-emitting section SHCE temporarily passes through light-shielding plate 120, and the light-receiving section SHCR receives the light from light-emitting section SHCE. At this time, the detected voltage of the sensor SHC rises from the L level to the H level at a timing at which the light-receiving section SHCR receives the light from the light-emitting section SHCE (point A), and the detected voltage falls again from the H level to the L level at a timing at which the light from the light-emitting section SHCE is blocked (point B). As a result, as shown in FIG. 5, the detected voltage has a detection width in which the central position has a median value in the shift range. This detection width is a value that depends upon the width W of gap portion 121 provided in light-shielding plate 120.

Herein, as mentioned above, in a state in which projection lens assembly 40 is not in the central position (the sensor SHC is in the L level), projector 1 has a function of automatically returning projection lens assembly 40 to the central position in the shift range when a reset switch provided on projector 1 main body or the remote controller is turned ON. As to the processing for automatic return, for example, as means for returning projection lens assembly 40 to the central position in the shift range in the left-and-right direction, a configuration can be employed in which projection lens assembly 40 is allowed to travel in the left or right direction from the position after the shift operation toward the central position, a detected voltage of the sensor SHC as the horizontal center sensor at this time is monitored, and travelling of projection lens assembly 40 is stopped at a timing at which the detected voltage rises from the L level to the H level.

However, the detection width of the sensor SHC that is the horizontal center sensor is dependent upon the width W of gap portion 121 provided in light-shielding plate 120. Therefore, when the width of the gap portion is increased, there may be a problem that travelling of projection lens assembly 40 stops at a position displaced from the central position (in the vicinity of point A or B). Furthermore, there may be a problem that the stopping position of projection lens assembly 40 varies depending upon the direction in which projection lens assembly 40 is allowed to travel.

Figure 6:
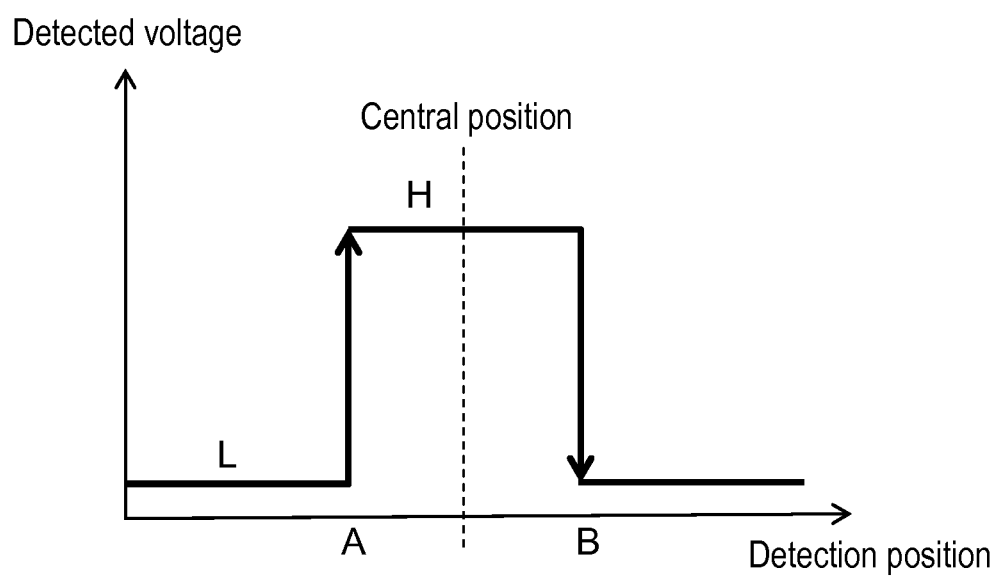
FIG. 6 is a graph showing another example of a detected voltage of the sensor SHC (horizontal center sensor) in accordance with this exemplary embodiment.

Specifically, as shown in FIG. 6, as the wider the width of the gap portion of light-shielding plate 120 is increased, the detection width of the horizontal center sensor SHC is increased. Herein, it is assumed that returning to the central position in the shift range in the left-and-right direction is carried out by the above-mentioned configuration. That is to say, when projection lens assembly 40 is allowed to travel in the left or right direction from the position after the shift operation toward the central position, travelling of projection lens assembly 40 is stopped at a timing at which the detected voltage of the horizontal center sensor SHC rises from the L level to the H level.

In this case, since the detection width of the horizontal center sensor SHC is large, the stopping position (point A or B) of projection lens assembly 40 is largely displaced from the central position in the shift range. Therefore, displacement corresponding to the detection width is generated between the stopping position (point A) of projection lens assembly 40 when projection lens assembly 40 is allowed to travel in the right direction toward the central position and the stopping position (point B) of projection lens assembly 40 when projection lens assembly 40 is allowed to travel in the left direction toward the central position. As a result, this makes it difficult to accurately return projection lens assembly 40 to the central position.

In order to avoid such problems, a sensor that is designed to have a narrow detection width is disposed in the central position, so that the central position can be detected strictly. However, such a configuration needs to form a mold having high strength in order to narrow gap portion 121, thus increasing a manufacturing cost. The configuration has another problem that there is a limit to narrowing the detection width.

Then, in projector 1 in accordance with this exemplary embodiment, as means for automatically returning projection lens assembly 40 to the central position in the shift range with high accuracy without using expensive components, processing procedure for allowing projection lens assembly 40 to travel in a go and return direction is shown in FIG. 7.

FIG. 7 is a flowchart for illustrating automatic return processing of projection lens assembly 40 in accordance with this exemplary embodiment. The flowchart shown in FIG. 7 can be achieved by executing a program that has been previously stored in microcomputer 50.

With reference to FIG. 7, firstly, in order to execute automatic return processing of projection lens assembly 40, after a shift operation of projection lens assembly 40 is carried out (in a state in which projection lens assembly 40 is not located in the central position), it is determined whether or not automatic return of projection lens assembly 40 is required (step S10). Specifically, it is determined whether or not a reset switch provided on projector 1 main body or a remote controller is turned ON. When it is determined that the automatic return of projection lens assembly 40 is not required (when the determination in step S10 is judged to be NO), the processing is ended.

On the other hand, when the reset switch is turned ON and it is determined that the automatic return of projection lens assembly 40 is required (when the determination in step S10 is judged to be YES), a position of projection lens assembly 40 is detected at a timing at which the automatic return is started (step S20).

Figure 8A:
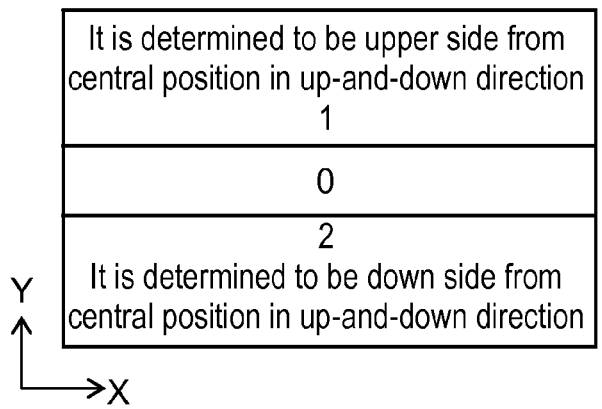
FIG. 8 is a view for illustrating position detection of the projection lens assembly in accordance with this exemplary embodiment.
Figure 8B:
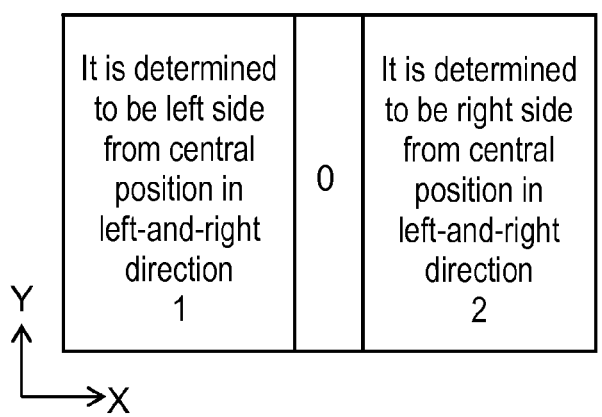
Figure 8C:
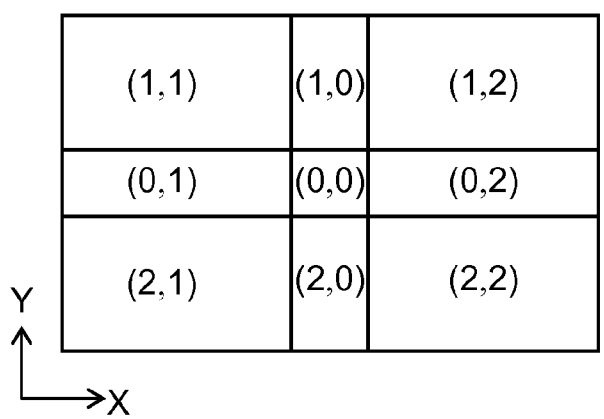

Specifically, microcomputer 50 detects a position of projection lens assembly 40 based on a history of operations of the switch provided on projector 1 main body or a remote control during execution of the shift operation. FIGS. 8A-C are views for illustrating position detection of the projection lens assembly in accordance with this exemplary embodiment (description of step S20). With reference to FIG. 8A, the position of projection lens assembly 40 in the up-and-down direction is divided into a vicinity of the central position in the shift range, an upside region from the vicinity of the central position, and a downside region from the vicinity of the central position. Microcomputer 50 successively stores an operation amount and an operation direction of the switch, and writes which of the three regions projection lens assembly 40 is positioned by using numerical values "1," "0," and "2." In the example shown in FIG. 8A, the upside region from the central position in the shift range in the up-and-down direction is represented by "1," the region in the vicinity of the central position is represented by "0," and the downside region from the central position is represented by "2," respectively. As a matter of course, these numeric values are updated according to the operation of the switch.

Similarly, with reference to FIG. 8B, the position of projection lens assembly 40 in the left-and-right direction is divided into a vicinity of the central position in the shift range, a left side region from the vicinity of the central position, and a right side region from the vicinity of the central position. Microcomputer 50 successively stores an operation amount and an operation direction of the switch, and writes which of these three regions projection lens assembly 40 is positioned by using numerical values "1," "0," and "2." In the example shown in FIG. 8B, the left side region from the central position in the shift range in the left-and-right direction is represented by "1," a region in the vicinity of the central position is represented by "0," and the right side region from the central position is represented by "2," respectively. As a matter of course, these numeric values are updated according to the operation of the switch.

Then, by combining FIGS. 8A and B, the position of projection lens assembly 40 in the shift range can be represented by a coordinate consisting of a position in the x-direction (left-and-right direction) and a position in the y-direction (up-and-down direction) as shown in FIG. 8C. For example, when the central position in the shift range in the up-and-down and left-and-right directions is represented by a coordinate (0, 0), the region in the left side with respect to the central position can be represented by a coordinate (0, 1), and the region in the right side with respect to the central position can be represented by a coordinate (0, 2). Furthermore, a region at the upper and left side with respect to the central position can be represented by a coordinate (1, 1).

Microcomputer 50 successively stores an operation amount and an operation direction of the switch during execution of the shift operation with the central position (0, 0) in FIG. 8C as an initial value, and thereby updates the coordinate of projection lens assembly 40. Then, microcomputer 50 detects a position of projection lens assembly 40 at the timing at which the automatic return is started.

With reference to FIG. 7 again, it is assumed that the position of projection lens assembly 40 detected in step S20 is in the right side with respect to the central position (in the case corresponding to the coordinate (0, 2)). In this case, the automatic return of projection lens assembly 40 is carried out according to procedures of steps S30 to S110.

Specifically, in step S30, microcomputer 50 allows projection lens assembly 40 to travel in the direction toward the central position (that is, leftward) at high speed by projection lens drive section 60. At this time, microcomputer 50 monitors a detected signal (detected voltage) from the horizontal center sensor SHC, and determines whether or not the detected voltage rises from the L level to the H level (referred to as point A, temporarily) (step S40). When the detected voltage of the horizontal center sensor does not rise from the L level to the H level (when the determination in step S40 is judged to be NO), the processing is returned to step S30.

On the other hand, when it is determined that the detected voltage of the horizontal center sensor SHC rises from the L level to the H level (when the determination in step S40 is judged to be YES), at the same time as step 50, microcomputer 50 starts up an incorporated counter at a timing at which the detected voltage rises to the H level, and thereby it starts to measure a time (travel time) that is required for projection lens assembly 40 to travel in the detection width of the horizontal center sensor SHC (between A and B in FIG. 6) (step S50). After step 50, microcomputer 50 allows projection lens assembly 40 to travel in the left direction at low speed by projection lens drive section 60 (step S60).

Next, it is determined whether or not the detected voltage of the horizontal center sensor SHC falls from the H level to the L level (referred to as point B, temporarily) (step S70). When the detected voltage does not fall from the H level to the L level (when the determination in step S70 is judged to be NO), the processing is returned to step S60.

On the other hand, when it is determined that the detected voltage of the horizontal center sensor SHC falls from the H level to the L level (when the determination in step S70 is judged to be YES), microcomputer 50 finishes measuring the travel time to travel on the detection width (FIG. 6), and calculates the travel time (step S80).

Next, microcomputer 50 allows projection lens drive section 60 to drive projection lens assembly 40 in the opposite direction such that projection lens assembly 40 travels in the direction toward the central position (that is, rightward) at high speed (step S90).

Next, it is determined whether or not the detected voltage of the horizontal center sensor SHC falls from the H level to the L level (step S100). In the determination in step S100, point A determined in step S40 is specified again, and point A is a starting point driven in the below-mentioned step 5110. When the detected voltage does not fall from the H level to the L level (when the determination in step S100 is judged to be NO), the processing is returned to step S90. On the other hand, when it is determined that the detected voltage of the horizontal center sensor SHC falls from the H level to the L level (when the determination in step S100 is judged to be YES), microcomputer 50 drives projection lens assembly 40 leftward again at low speed by a drive time (the drive time corresponds to ½ of the travel time) by using the travel time calculated in step S80 (step S110). Thus, projection lens assembly 40 travels to approach the central position of the detection width of the horizontal center sensor SHC. With such a configuration, even if the travel time of the detection width from the left direction and the travel time of the detection width from the right direction are different from each other because of engagement of gears and drive resistance, driving can be carried out by the drive time (corresponding to ½ of the travel time) from the direction that is the same direction at which the travel time is once measured. Therefore, projection lens assembly 40 can be automatically returned to the central position with high accuracy.

MODIFIED EXAMPLE

Figure 9:
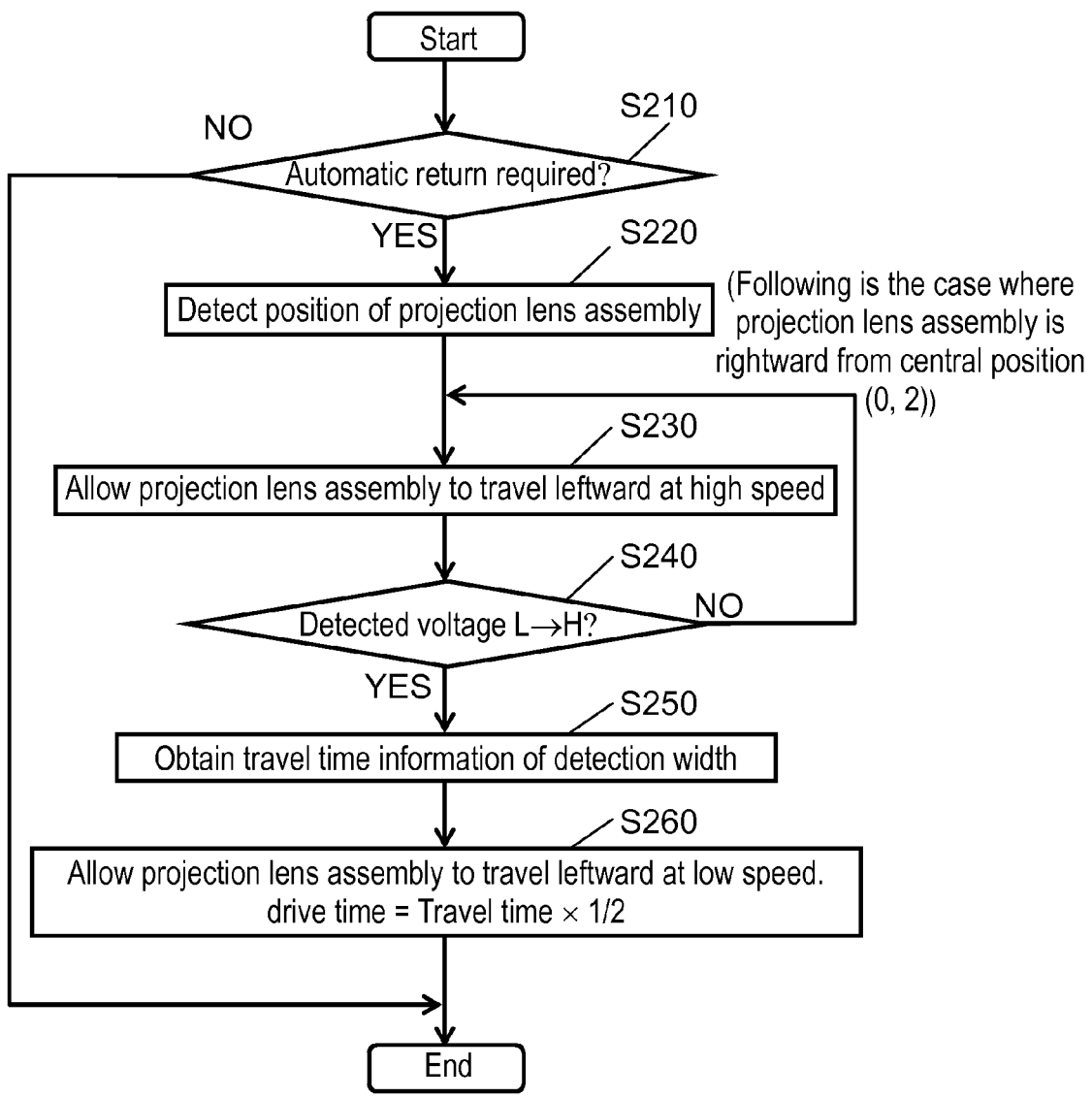
FIG. 9 is a flowchart for illustrating an automatic return processing of a projection lens assembly in accordance with a modified example of this exemplary embodiment.

In the following, a configuration of a projection image display device in accordance with a modified example of the above-mentioned exemplary embodiment is described with reference to drawings. In the modified example, description of the same portions as in the exemplary embodiment is omitted. The modified example is different from the above-mentioned exemplary embodiment in the following points. That is to say, microcomputer 50 previously stores a travel time when projection lens assembly 40 travels in the detection width from the right direction and a travel time when projection lens assembly 40 travels in the detection width from the left direction. When the reset switch is turned ON for automatic return, microcomputer 50 drives that projection lens assembly 40 travels in the direction toward the central position; and that when the detected voltage of the horizontal center sensor SHC rises from the L level to the H level, projection lens assembly 40 approaches the central position by using the previously stored travel time information. In the following, automatic return processing of the projection lens assembly in accordance with the modified example of the exemplary embodiment mentioned above is described in detail. With reference to FIG. 1 again, when the electric power supply of projector 1 is turned ON, microcomputer 50 carries out various initial operations and, at the same time, allows projection lens assembly 40 to operate in the left-right and up-and-down directions. At this time, times required to pass through the detection width from the left direction or the right direction are measured, and measurement results are stored in microcomputer 50. Similarly, times required to pass through the detection width from the upper direction or the down direction are measured, respectively. The respective measurement results are stored in a nonvolatile memory of microcomputer 50. FIG. 9 is a flowchart for illustrating automatic return processing of the projection lens assembly in accordance with the modified example in accordance with this exemplary embodiment. The flowchart shown in FIG. 9 can be achieved by executing a program that has been previously stored in microcomputer 50. With reference to FIG. 9, firstly, in order to execute the automatic return processing of projection lens assembly 40, after the shift operation of projection lens assembly 40 is carried out (in a state in which projection lens assembly 40 is not positioned in the central position), it is determined whether or not the automatic return of projection lens assembly 40 is required (step S210). Specifically, it is determined whether or not a reset switch provided in projector 1 main body or a remote control is turned ON. When it is determined that the automatic return of projection lens assembly 40 is not required (when the determination in step 5210 is judged to be NO), the processing is ended.

On the other hand, when the reset switch is turned ON and thereby it is determined that the automatic return of projection lens assembly 40 is required (when the determination in step S210 is judged to be YES), a position of projection lens assembly 40 at a timing at which the automatic return is started is detected (step S220).

Herein, as in the state assumed in FIG. 7, it is assumed that the position of projection lens assembly 40 detected in step S220 is in the right side with respect to the central position (in the case corresponding to the coordinate (0, 2)). In this case, the automatic return of projection lens assembly 40 is carried out according to procedures of steps S230 to S260.

Specifically, in step S230, microcomputer 50 allows projection lens assembly 40 to travel in the direction toward the central position (that is, leftward) at high speed by projection lens drive section 60. At this time, microcomputer 50 monitors a detected signal (detected voltage) from the horizontal center sensor SHC, and determines whether or not the detected voltage rises from the L level to the H level (step S240). When the detected voltage of the horizontal center sensor does not rise from the L level to the H level (when the determination in step S240 is judged to be NO), the processing is returned to step S230.

On the other hand, when it is determined that the detected voltage of the horizontal center sensor SHC rises from the L level to the H level (when the determination in step S240 is judged to be YES), microcomputer 50 calls the previously stored travel time information in the case of traveling in the detection width from the left direction (step S250). Next, microcomputer 50 carries out driving leftward at low speed by a drive time (the drive time corresponds to ½ of the travel time) by using the travel time information (step S260). Thus, projection lens assembly 40 is driven to approach the central position from the right end of the detection width of the horizontal center sensor SHC.

As mentioned above, in the automatic return processing of projection lens assembly 40 shown in FIGS. 7 and 9, when projection lens assembly 40 is allowed to travel leftward, projection lens assembly 40 is driven by a time (travel time) that is ½ a time (travel time) required for projection lens assembly 40 to travel through the detection width of the horizontal center sensor SHC, thereby projection lens assembly 40 is allowed to return to the central position in the shift range in the left-and-right direction. Accordingly, a sensor capable of strictly detecting the central position is not necessary to be newly added, and the detection width is not measured after the reset switch is turned ON. Therefore, an operation time for automatic return to the central position of the projection lens assembly by reset can be shortened.

Note here that the processing flows of FIGS. 7 and 9 have a configuration in which a drive time is calculated by using, as an indicator, a travel time required for projection lens assembly 40 to travel in the detection width of the horizontal center sensor SHC. However, a configuration may be employed in which microcomputer 50 uses a number of times of outputting of control pulse (for example, a PWM (pulse width modulation) signal) output to motors M1 and M2 (FIG. 2) included in projection lens drive section 60 as an indicator instead of the travel time.

In this case, microcomputer 50 measures the number of times of outputting a control pulse required for projection lens assembly 40 to travel in the detection width of the horizontal center sensor SHC, and calculates a number corresponding to ½ of the measured number of times of outputting as the number of driving times. Then, projection lens drive section 60 drives projection lens assembly 40 according to the control pulse of the calculated number of driving times.

Note here that the processing flows of FIGS. 7 and 9 assume a case in which an initial position of the automatic return of projection lens assembly 40 is right side with respect to the central position (a case corresponding to a coordinate (0, 2)) as the processing of automatic return of projection lens assembly 40. However, the same processing procedure can be carried out also when the initial position of the automatic return of projection lens assembly 40 is left side with respect to the central position (a case corresponding to a coordinate (0, 1)). In addition, also when projection lens assembly 40 is returned to the central position (the case corresponding to a coordinate (1, 0) or a coordinate (2, 0)), the automatic returning can be carried out by the same processing procedure. Furthermore, as the processing for automatic return of projection lens assembly 40, also when the initial position of the automatic return of projection lens assembly 40 is in the position obliquely upper and left side with respect to the central position (a case corresponding to a coordinate (1, 1)), by carrying out combination of the automatic return processing in the left-and-right direction and the automatic return processing in the up-and-down direction, projection lens assembly 40 can be returned to the central position in the shift range.

Furthermore, as the automatic return processing of projection lens assembly 40, when an initial position of the automatic return of projection lens assembly 40 is the central position (a case corresponding to a coordinate (0, 0)), it is uncertain whether or not projection lens assembly 40 is in the central position. In this case, for example, projection lens assembly 40 can be returned to the central position in the shift range by allowing projection lens assembly 40 to travel to an oblique position, that is, a position at the upper and left side with respect to the central position (a case corresponding to a coordinate (1, 1)) once, and then carrying out the automatic return processing. In step S70 and step S100 in the processing flow of FIG. 7, when it is sensed that the detected voltage of the horizontal center sensor SHC rises from the L level to the H level or falls from the H level to the L level, reverse driving is carried out immediately. However, overshoot can be carried out with mechanical backlash of lens shift mechanism 42 taken into consideration. In this case, in step S100 of the processing flow of FIG. 7, step S110 is driven based on a point at which the detected voltage of the horizontal center sensor SHC falls from the H level to the L level as a base point.

In the modified example, the detection width is measured previously at the time when the electric power supply of projector 1 is turned ON, but a user may optionally make a command. Moreover, when projector 1 is shipped, execution may be carried out previously.

Furthermore, in this exemplary embodiment, the liquid crystal projector is employed as the projector. The projector is not necessarily limited to this. For example, the technique of the present invention may be employed to other projectors such as a DLP (Digital Light Processing) (Registered Trademark) type projector.

It should be construed that all of the exemplary embodiments disclosed herein are not restrictive but are examples. The scope of the present invention is intended to be described not by the exemplary embodiments mentioned above but by the claims, and to encompass other possible variations in the meaning and the scope of possible equivalents to the claims.

REFERENCE MARKS IN THE DRAWINGS

1: projector (projection image display device)
38: liquid crystal display drive section (optical modulating section)
40: projection lens assembly
42: lens shift mechanism
50: microcomputer (control section, time-measuring unit, measurement unit, memory section)
60: projection lens drive section (drive mechanism)
64: vertical and horizontal center sensor (central position detection section)
M1, M2: motor

The invention claimed is:

1. A lens shift mechanism for allowing a projection lens assembly to travel in a go and return direction in a certain range in at least one axial direction among axes perpendicular to an optical axis of the projection lens assembly, the lens shift mechanism comprising:
a drive mechanism for driving the projection lens assembly in at least the one axial direction;
a control section for controlling the drive mechanism such that the projection lens assembly is returned to a central position in the certain range; and
a central position detection section for detecting that the projection lens assembly reaches the central position,
wherein the central position detection section has a detection width in which the central position has a median value along the one axial direction,
when a direction from a position, which is located at a time point at which returning is started, toward the central position, is defined as a go direction, the control section commands that the driving mechanism should perform following operations:
a first operation of allowing the projection lens assembly to travel in the go direction and to pass one end of the detection width and to travel at least the detection width;
after the first operation, a second operation of allowing the projection lens assembly to travel in a return direction by at least the detection width; and
after the projection lens assembly travels in at least the detection width by the second operation, a third operation of allowing the projection lens assembly to travel in the go direction from one end of the detection width by ½ of the detection width which has been traveled in the go direction.

2. The lens shift mechanism of claim 1,
wherein the control section further comprises a time-measuring unit for measuring a travel time required for the projection lens assembly to travel in the detection width by the first operation based on a detected value of the central position detection section, and
in the third operation, the driving mechanism allows the projection lens assembly to travel in the go direction for a time corresponding to ½ of the travel time for the detection width according to the travel time measured by the time-measuring unit.

3. The lens shift mechanism of claim 1,
wherein the drive mechanism comprises a motor for driving according to a control pulse output from the control section,
the control section further comprises a measurement unit for measuring a number of output times of the control pulse required for the projection lens assembly to travel in the detection width by the first operation based on the detected value of the central position detection section, and
in the third operation, the driving mechanism allows the projection lens assembly to travel in the go direction in a number of driving times, that is, a number of times corresponding to ½ of the number of output times of the control pulse measured by the measurement unit.

4. A lens shift mechanism for allowing a projection lens assembly to travel in a go and return direction in a certain range in at least one axial direction among axes perpendicular to an optical axis of the projection lens assembly, the lens shift mechanism comprising:
a drive mechanism for driving the projection lens assembly in at least the one axial direction;
a control section for controlling the drive mechanism such that the projection lens assembly is returned to a central position in the certain range; and
a central position detection section for detecting that the projection lens assembly reaches the central position,
wherein the central position detection section has a detection width in which the central position has a median value along the one axial direction,
when a direction from a position, which is located at a time point at which returning is started, toward the central position, is defined as a go direction, the control section commands that the driving mechanism should perform following operations:
a first operation of allowing the projection lens assembly to travel in the go direction to one end of the detection width, and
a second operation of allowing the projection lens assembly to travel in the go direction from the one end of the detection width by ½ of the detection width based on information of the detection width, the information is supplied by a storage section which has previously stored the information in travelling in the go direction.

5. A projection image display device comprising:
a lens shift mechanism of claim 1;
an optical modulation section for image-modulating light from a light source based on an image input signal; and
a projection section which is supported by the lens shift mechanism, and which enlarge-projects light from the optical modulation section onto a projection surface.

6. A projection image display device comprising:
a lens shift mechanism of claim 2;
an optical modulation section for image-modulating light from a light source based on an image input signal; and
a projection section which is supported by the lens shift mechanism, and which enlarge-projects light from the optical modulation section onto a projection surface.

7. A projection image display device comprising:
a lens shift mechanism of claim 3;
an optical modulation section for image-modulating light from a light source based on an image input signal; and
a projection section which is supported by the lens shift mechanism, and which enlarge-projects light from the optical modulation section onto a projection surface.

8. A projection image display device comprising:
a lens shift mechanism of claim 4;
an optical modulation section for image-modulating light from a light source based on an image input signal; and
a projection section which is supported by the lens shift mechanism, and which enlarge-projects light from the optical modulation section onto a projection surface.

* * * * *